United States Patent [19]

Mozer

[11] 4,314,105

[45] Feb. 2, 1982

[54] DELTA MODULATION METHOD AND SYSTEM FOR SIGNAL COMPRESSION

[76] Inventor: Forrest S. Mozer, 38 Somerset Pl., Berkeley, Calif. 94707

[21] Appl. No.: 81,281

[22] Filed: Oct. 2, 1979

Related U.S. Application Data

[60] Division of Ser. No. 761,210, Jan. 21, 1977, Pat. No. 4,214,125, which is a continuation of Ser. No. 632,140, Nov. 14, 1975, abandoned, which is a continuation-in-part of Ser. No. 525,388, Nov. 20, 1974, abandoned, which is a continuation-in-part of Ser. No. 432,859, Jan. 14, 1974, abandoned.

[51] Int. Cl.³ .............................................. H04B 1/00
[52] U.S. Cl. ...................... 179/15.55 R; 179/15.55 T; 375/27; 332/11 D
[58] Field of Search .......... 179/15.55 R, 1 SM, 1 SA; 332/11 D; 375/27, 28; 358/260, 261; 340/347 DD

[56] References Cited

U.S. PATENT DOCUMENTS 3,707,680 12/1972 Gabbard et al. ...................... 375/27
3,821,494 6/1974 Besseyre ............................... 375/28
3,825,832 7/1974 Frei et al. .............................. 375/28

OTHER PUBLICATIONS

J. Flanagan, "Speech Analysis, Synthesis, Perception," 2nd Ed., Springer-Verlag, New York, 1972, pp. 401–405.

Primary Examiner—Mark E. Nusbaum
Assistant Examiner—E. S. Kemeny
Attorney, Agent, or Firm—Townsend and Townsend

[57] ABSTRACT

This delta modulation system uses the differences between three successive samples of a waveform (the $i-1$, $i$, and $i+1$) such that the number of bits per digitization is reduced from four to two. The value vi of the ith sample is calculated by the equation $v_i = v_i - 1 + f(\Delta_{i-1}, \Delta_i)$, and f is a special function defined by 16 values stored in a read-only memory.

8 Claims, 8 Drawing Figures

DELTA MODULATION METHOD AND SYSTEM FOR SIGNAL COMPRESSION

CROSS-REFERENCES TO RELATED APPLICATIONS

This application is a divisional of co-pending application Ser. No. 761,210, filed Jan. 21, 1977 entitled "METHOD AND APPARATUS FOR SPEECH SYNTHESIZING," now U.S. Pat. No. 4,214,125 issued July 22, 1980 which is a continuation of application Ser. No. 632,140, filed Nov. 14, 1975 entitled "METHOD AND APPARATUS FOR SPEECH SYNTHESIZING," now abandoned, which is a continuation-in-part of application Ser. No. 525,388, filed Nov. 20, 1974, entitled "METHOD AND APPARATUS FOR SPEECH SYNTHESIZING," now abandoned, which, in turn, is a continuation-in-part of application Ser. No. 432,859, filed Jan. 14, 1974, entitled "METHOD FOR SYNTHESIZING SPEECH AND OTHER COMPLEX WAVEFORMS," which was abandoned in favor of application Ser. No. 525,388.

INCORPORATION BY REFERENCE

The entire disclosure of commonly owed, allowed co-pending application Ser. No. 761,210, filed Jan. 21, 1977, entitled "METHOD AND APPARATUS FOR SPEECH SYNTHESIZING" now U.S. Pat. No. 4,214,125 issued July 22, 1980 is hereby incorporated by reference.

FIELD OF THE INVENTION

The present invention relates to speech synthesis and more particularly to a method for analyzing and synthesizing speech and other complex waveforms using basically digital techniques.

SUMMARY OF THE INVENTION

The invention comprises a method and system for time domain information signal compression termed "floating zero, two-bit delta modulation", the method comprising the steps of delta modulating digital signals corresponding to information input signals prior to storage in a first memory by setting the value of the ith digitization of the sampled signal equal to the value of the (i−1)th digitization of the sampled signals plus $f(\Delta_{i-1}, \Delta_i)$ where $f(\Delta_{i-1}, \Delta_i)$ is an arbitrary function having the property that small changes of waveform from one digitization to the next are reproduced well while greater changes in either direction are accommodated by slewing in either direction by three or more levels per digitization.

The objectives, features and advantages of the invention will be more readily understood upon consideration of the following detailed description of certain preferred embodiments of the invention, taken in conjunction with the accompanying drawings.

BRIEF DESCRIPTION OF DRAWINGS

The drawings are not numbered consecutively starting with number 1 in this divisional case, but are numbered the same as in the parent case.

FIGS. 7a–7c represent, respectively, digitized periods of speech before phase adjusting, after phase adjusting, and after half period zeroing and delta-modulation, while FIG. 7d is a composite curve resulting from the superimposition of the curves of FIGS. 7b and 7c;

DETAILED DESCRIPTION OF CERTAIN PREFERRED EMBODIMENTS

Figure 5:
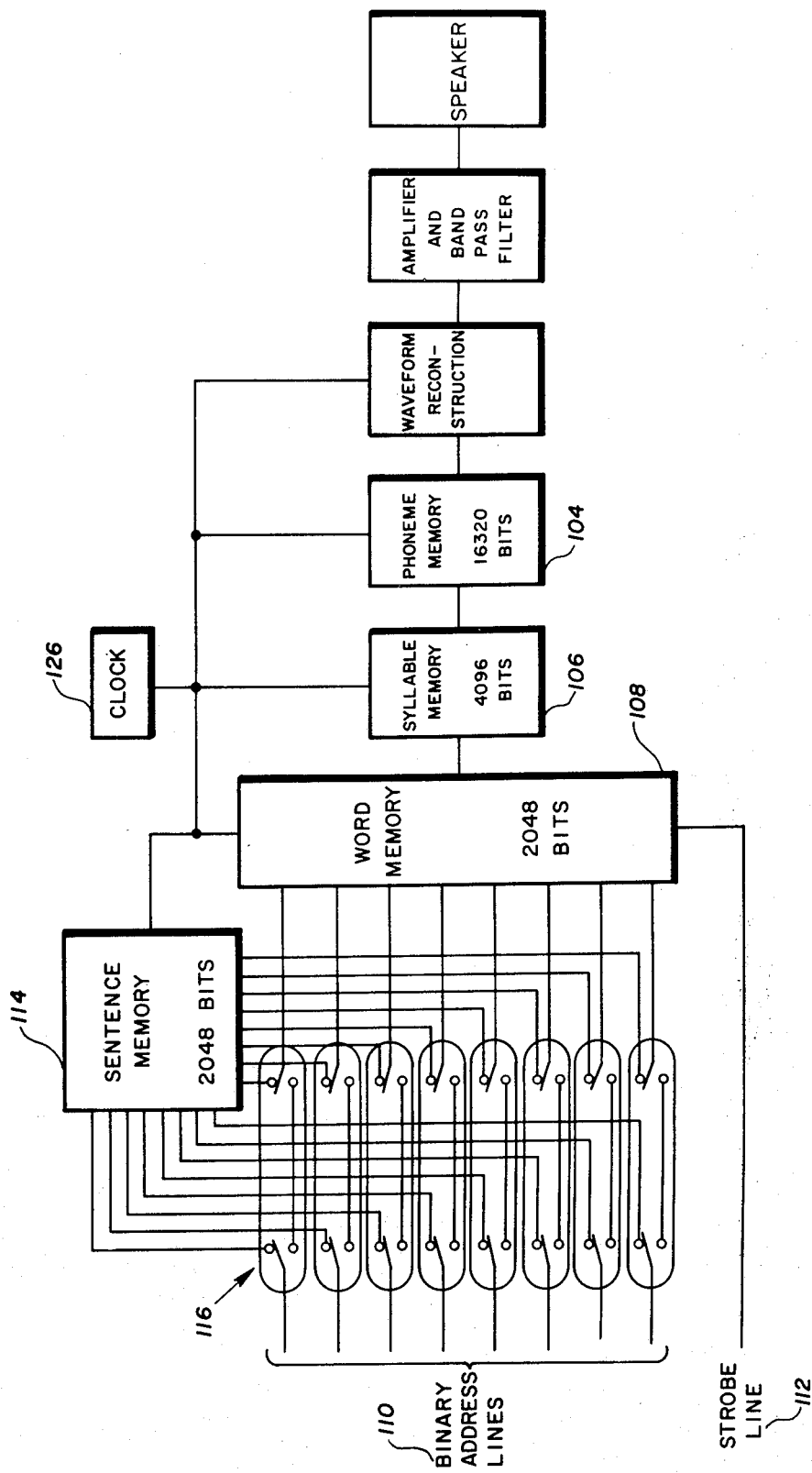
FIG. 5 is a simplified block diagram of a speech synthesizer incorporating the present invention.

A block diagram of the preferred embodiment of a speech synthesizer 103 incorporating the invention is given in FIG. 5. It should be understood, however, that the initial programming of the elements of this block diagram by means of a human operator and a digital computer will be discussed in detail in reference to FIG. 9. The synthesizer phoneme memory 104 stores the digital information pertinent to the compressed waveforms and contains 16,320 bits of information. The synthesizer syllable memory 106 contains information signals as to the locations in the phoneme memory 104 of the compressed waveforms of interest to the particular sound being produced and it also provides needed information for the reconstruction of speech from the compressed information in the phoneme memory 104. Its size is 4096 bits. The synthesizer word memory 108, whose size is 2048 bits, contains signals representing the locations in the syllable memory 106 of information signals for the phoneme memory 104 which construct syllables that make up the word of interest.

To recreate the compressed speech information stored in the speech synthesizer a word is selected by impressing a predetermined binary address on the seven address lines 110. This word is then constructed electronically when the strobe line 112 is electrically pulsed by utilizing the information in the word memory 108 to locate the addresses of the syllable information in the syllable memory 106, and in turn, using this information to locate the address of the compressed waveforms in the phoneme memory 104 and to ultimately reconstruct the speech waveform from the compressed data and the reconstruction instructions stored in the syllable memory 106. The digital output from the phoneme memory 104 is passed to a delta-modulation decoder circuit 184 and thence through an amplifier 190 to a speaker 192. The diagram of FIG. 5 is intended only as illustrative of the basic functions of the synthesizer portion of the invention; a more detailed description is given in reference to FIGS. 10 and 11a–11f in the reference patent.

Groups of words may be combined together to form sentences in the speech synthesizer through addressing a 2048 bit sentence memory 114 from a plurality of external address lines 110 by positioning seven double-pole double-throw switches 116 electronically into the configuration illustrated in FIG. 5.

The selected contents of the sentence memory 114 then provide addresses of words to the word memory 108. In this way, the synthesizer is capable of counting from 1 to 40 and can also be operated to selectively say such things as: "3.5+7−6=4.5," "1942 over 0.0001=overflow," "2×4=8," "4.2 volts dc," "93 ohms," "17 amps ac," "11:37 and 40 seconds, 11:37 and 50 seconds," "3 up, 2 left, 4 down," "6 pounds 15 ounces equals 8 dollars and 76 cents," "55 miles per hour," and "2 miles equals 3218 meters, equals 321,869 centimeters," for example.

COMPRESSION TECHNIQUES

As described above, the basic content of the memories 108, 106 and 104 is the end result of certain speech compression techniques subjectively applied by a human operator to digital speech information stored in a computer memory. This invention pertains to a specific one of these techniques. In actual practice, certain basic speech information necessary to produce the one hundred and twenty-eight word vocabulary is spoken by the human operator into a microphone, in a nearly monotone voice, to produce analog electrical signals representative of the basic speech information. These analog signals are next differentiated with respect to time. This information is then stored in a computer and is selectively retrieved by the human operator as the speech programming of the speech synthesizer circuit takes place by the transfer of the compressed data from the computer to the synthesizer. This process will be explained in greater detail hereinafter in reference to FIG. 9.

DELTA-MODULATION

Since a typical speech waveform is relatively smooth and continuous, the difference in amplitude between two successive digitizations of the waveform is generally much smaller than either of the two amplitudes. Hence, less information need be retained if differences of amplitudes of successive digitizations are stored in the phoneme memory and the next amplitude in the waveform is obtained by adding the appropriate contents of the memory to the previous amplitude.

This process of delta modulation has been used in many speech compression schemes (Flanagan, 1972). Many versions of the technique have been studied by the applicant on a computer while designing the speech synthesizer of the invention in an attempt to reduce the number of bits per digitization from four to two. A scheme has been found that produces little or no detectable degradation of the speech quality or intelligibility and this scheme is called "floating-zero, two-bit delta modulation." In this technique the value $v_i$ of the ith digitization in the waveform is obtained from the (i−1)th value, $v_{i-1}$, by the equation $$v_i = v_{i-1} + f(\Delta_{i-1}, \Delta_i)$$

where f is an arbitrary function and $\Delta_i$ is the ith value of the two-bit function stored in the phoneme memory 104 as the delta-modulation information pertinent to the ith digitization. Since the function f depends on the previous as well as the present digitization, its zero level and amplitude may be made dependent on estimates of the slope of the waveform obtained from $\Delta_{i-1}$ and $\Delta_i$, so the zero level of f may be said to be floating and this delta-modulation scheme may be called predictive. Since there are only sixteen combinations of $\Delta_{i-1}$ and $\Delta_i$ because each is a two-bit binary number, the function f is uniquely defined by sixteen values that are stored in a read-only memory in the speech synthesizer. Approximately thirty different functions, f, were tested in a computer in order to select the function utilized in the prototype speech synthesizer and described in Table 4 below:

TABLE 4

| Values Of The Function $f(\Delta_{i-1}, \Delta_i)$ | | |
|---|---|---|
| $\Delta_{i-1}$ | $\Delta_i$ | $f(\Delta_{i-1}, \Delta_i)$ |
| 3 | 3 | 3 |
| 3 | 2 | 1 |
| 3 | 1 | 0 |
| 3 | 0 | −1 |
| 2 | 3 | 3 |
| 2 | 2 | 1 |
| 2 | 1 | 0 |
| 2 | 0 | −1 |
| 1 | 3 | 1 |
| 1 | 2 | 0 |
| 1 | 1 | −1 |
| 1 | 0 | −3 |
| 0 | 3 | 1 |
| 0 | 2 | 0 |
| 0 | 1 | −1 |
| 0 | 0 | −3 |

The above defined function has the property that small (<2 level) changes of the waveform from one digitization to the next are reproduced well while large changes in either direction are accommodated through the capability of slewing in either direction by three levels per digitization. This form of delta-modulation reduces the information content of the phoneme memory 104 in the prototype speech synthesizer by a factor of two. This compression is achieved by replacing every 4 bit digitization in the original waveform with a 2 bit number that is found by conventional computer techniques to provide the best fit to the desired 4 bit value upon application of the above function. This string of 2 bit delta modulated numbers then replaces the original waveform in the computer and in the phoneme memory 104.

An example of the application of the floating-zero two-bit delta-modulation scheme is given in Table 5, in the second and third columns of which the amplitudes of the first twenty digitizations of a four-bit waveform are given in decimal and binary units. The two bits of delta-modulation information that would go into the phoneme memory 104 are next listed in decimal and binary, and, finally, the waveform that would be reconstructed by the prototype synthesizer from the compressed information in the phoneme memory 104 is given:

TABLE 5

| Example of Delta Modulation | | | | | | |
|---|---|---|---|---|---|---|
| Digi-tiza-tion | Amplitude of the Original Waveform | | Delta-Modulation Information ($\Delta_i$) | | Amplitude of the Reconstructed Waveform | |
| | Decimal | Binary | Decimal | Binary | Decimal | Binary |
| 1 | 10 | 1010 | 3 | 11 | 10 | 1010 |
| 2 | 13 | 1101 | 3 | 11 | 13 | 1101 |
| 3 | 14 | 1110 | 2 | 10 | 14 | 1110 |
| 4 | 15 | 1111 | 2 | 10 | 15 | 1111 |
| 5 | 15 | 1111 | 1 | 01 | 15 | 1111 |
| 6 | 13 | 1101 | 1 | 01 | 14 | 1110 |
| 7 | 9 | 1001 | 0 | 00 | 11 | 1011 |
| 8 | 7 | 0111 | 0 | 00 | 8 | 1000 |
| 9 | 5 | 0101 | 0 | 00 | 5 | 0101 |
| 10 | 4 | 0100 | 1 | 01 | 4 | 0100 |
| 11 | 5 | 0101 | 3 | 11 | 5 | 0101 |
| 12 | 7 | 0111 | 2 | 10 | 6 | 0110 |
| 13 | 10 | 1010 | 3 | 11 | 9 | 1001 |
| 14 | 13 | 1101 | 3 | 11 | 12 | 1100 |
| 15 | 10 | 1010 | 0 | 00 | 11 | 1011 |
| 16 | 8 | 1000 | 0 | 00 | 8 | 1000 |
| 17 | 5 | 0101 | 0 | 00 | 5 | 0101 |
| 18 | 3 | 0011 | 1 | 01 | 4 | 0100 |
| 19 | 2 | 0010 | 1 | 01 | 3 | 0011 |

TABLE 5-continued

Example of Delta Modulation

| Digi-tiza-tion | Amplitude of the Original Waveform | | Delta-Modulation Information ($\Delta_i$) | | Amplitude of the Reconstructed Waveform | |
|---|---|---|---|---|---|---|
| | Decimal | Binary | Decimal | Binary | Decimal | Binary |
| 20 | 2 | 0010 | 1 | 01 | 2 | 0010 |

As an illustration of the process of delta modulation, consider, for example, the ninth digitization. The desired decimal amplitude of the waveform is five and the previous reconstructed amplitude was eight, so it is desired to subtract three from the previous amplitude. As indicated in the "Delta-Modulation Information" column under the heading "Decimal" of Table 5 for the eighth digitization, the previous decimal value of $\Delta_i$ was zero. Referring to Table 4, it can be seen that where the desired value of $f(\Delta_{i-1}, \Delta_i)$ is equal to $-3$ and the value of $\Delta_{i-1}$, i.e., the previous $\Delta_i$, is equal to zero, then the new value of $\Delta_i$ is chosen to be 0. Thus, the delta-modulation information stored in the phoneme memory 104 for this digitization is zero decimal or 00 binary and the prototype synthesizer would construct an amplitude of five from this and the previous data. If the change in amplitude required a subtraction of two instead of three, however, then a value for $\Delta_i$ would be chosen which would underestimate the desired change. In the example given, the nearest value of $f(\Delta_{i-1}, \Delta_i)$ would be $-1$ and from Table 4 a value of $\Delta_i=1$ would be selected.

To start the delta-modulation process of waveform reconstruction, a set of initial conditions must be assumed at the beginning of each pitch period. In the prototype synthesizer it is assumed that the zeroth digitization has a reconstructed amplitude level of seven and a value of $\Delta_i$ equal to three. Since the desired decimal value of the first digitization of Table 5 is ten and the assumed zeroth level is seven, three should be added to the assumed zeroth level. Referring to the first line of Table 4 and locating $\Delta_{i-1}=3$ and $f(\Delta_{i-1}, \Delta_i)=3$, the first value of $\Delta_i$ according to the table should be equal to 3 in decimal or 11 in binary.

As may also be seen from the example of Table 5, the reconstructed waveform does not reproduce the high frequency components or rapid variations of the initial waveform because the delta-modulation scheme has a limited slew rate. This approximately causes the incident waveform to be integrated in the process of delta modulation and this integration compensates for the differentiation of the initial waveform that is the first of the information compression techniques applied to the original signals, as described in the referenced patent.

The above process of delta-modulation is performed in conjunction with a compression technique of "Mozer phase adjusting" to yield a somewhat greater compression factor than two in a way that minimizes the degradation of intelligibility of the resulting speech beyond that obtainable by delta-modulation alone.

In this connection, it should be noted that the technique of Mozer phase adjusting is also preformed in such a manner that the difference between amplitudes of successive digitizations in the second and third quarters of the waveform should be consistent with possible values obtainable from the delta-modulation scheme.

Figure 7:
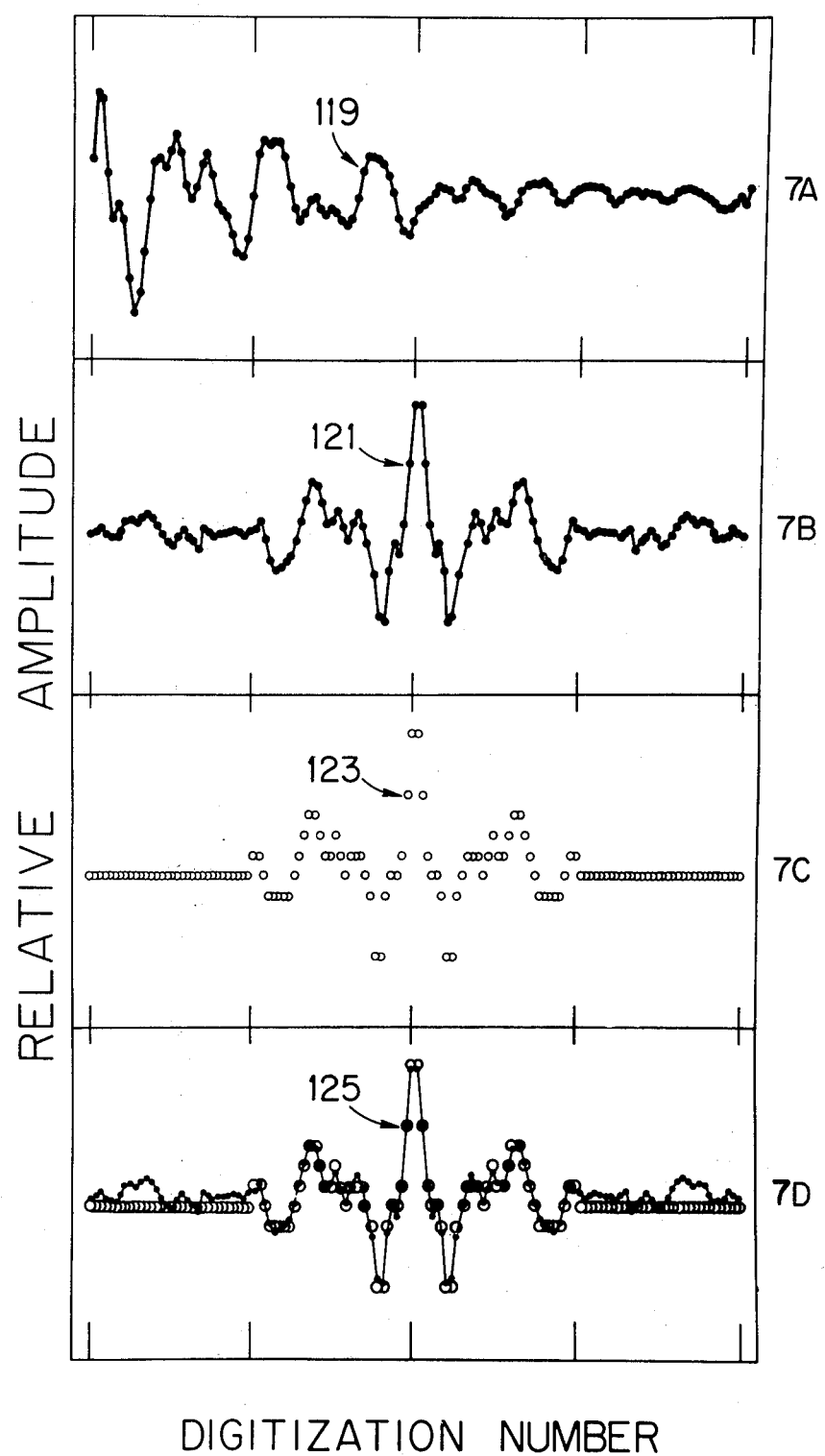

Furthermore, during Mozer phase adjusting, the amplitude values $S_n$ are selected to minimize the degradation associated with delta-modulation (see referenced patent). The resulting delta-modulated, half period zeroed version of waveform 121 is presented as waveform 123 in FIG. 7c. The two waveforms 121 and 123 are superimposed to produce the composite curve 125 of FIG. 7d.

Through examination of the composite waveform 125 it is seen that the delta-modulated waveform 123 seldom disagrees with the original waveform 121 by more than one-fourth the distance between successive delta-modulation levels. In fact, the average disagreement between the two curves is one-sixth of this difference. Since there are 16 allowable delta-modulation levels, a one-sixth error corresponds to an average fit of the original waveform 121 to approximately 6 bit accuracy. Thus, the two bit delta-modulated waveform is compressed in information content by a factor of 3 over the 6 bit waveform that it fits. This exceeds the factor of two compression achieved by delta-modulation in the above description of delta-modulation. This extra compression results from certain characteristics of the Mozer phase adjusting technique.

To summarize, the process of phase adjusting performed in the computer produces a factor of 3 compression of which, a factor of 2 comes from the necessity for storing only half the waveform and a factor of 1.5 comes from the improved usage of delta-modulation. A further advantage of phase adjusting is that it allows minimization of the power appearing in those parts of the waveform that are half-period zeroed. The compression factor achieved between waveforms 119 and 123 of FIGS. 7a and 7c and the two waveforms appear identical to the ear. Of this factor of 12, 2 results from half-period zeroing, 2 results from phase adjusting, and 3 results from the combination of phase adjusting and delta modulation.

THE SYNTHESIZER PHONEME MEMORY

The structure of the phoneme memory 104 is 96 bits by 256 words. This structure is achieved by placing 12 eight-bit read-only memories in parallel to produce the 96-bit word structure. The memories are read sequentially, i.e., eight bits are read from the first memory, then eight bits are read from the second memory, etc., until eight bits are read from the twelfth memory to complete a single 96-bit word. These 96 bits represent 48 pieces of two-bit delta-modulated amplitude information that are electronically decoded in the manner described in Table 5 and its discussion. The electronic circuit for accomplishing this process is described in detail in the referenced parent application in reference to FIG. 10.

For purposes of simplification in the construction of the prototype speech synthesizer, the delta-modulated information corresponding to the second quarter of each phase adjusted pitch period of data is actually stored in the phoneme memory even though this information can be obtained by inverting the waveform of the first quarter of that pitch period. Thus, the prototype phoneme memory contains 24,576 bits of information instead of 16,320 bits that would be required if electronic means were provided to construct the second quarter of phase adjusted pitch period data from the first. It is emphasized that this approach was utilized to simplify construction of the prototype unit while at the same time providing a complete test of the system concept.

THE SYNTHESIZER SYLLABLE MEMORY

The structure of the syllable memory 106 is 16 bits by 256 words. This structure is achieved by placing two eight-bit read-only memories in parallel. The syllable memory 106 contains the information required to combine sequences of outputs from the phoneme memory 104 into syllables or complete words.

THE SYNTHESIZER WORD MEMORY

The syllable memory 106 contains sufficient information to produce 256 phonemes of speech. The syllables thereby produced are combined into words by the word memory 108 which has a structure of eight bits by 256 words. By definition, each word contains two syllables, one of which may be a single pitch period of silence (which is not audible) if the particular word is made from only one syllable. Thus, the first pair of eight bit words in the word memory gives the starting locations in the syllable memory of the pair of syllables that make up the first word, the second pair of entries in the word memory gives similar information for the second word, etc. Thus, the size of the word memory 108 is sufficient to accommodate a 128-word vocabulary.

THE SENTENCE MEMORY

The word memory 108 can be addressed externally through its seven address lines 110. Alternatively, it may be addressed by a sentence memory 114 whose function is to allow for the generation of sequences of words that make sentences. The sentence memory 114 has a basic structure of 8 bits by 256 words. The first 7 bits of each 8-bit word give the address of the word of interest in the word memory 108 and the last bit provides information on whether the present word is the last word in the sentence. Since the sentence memory 114 contains 256 words, it is capable of generating one or more sentences containing a total of no more than 256 words.

Figure 9:
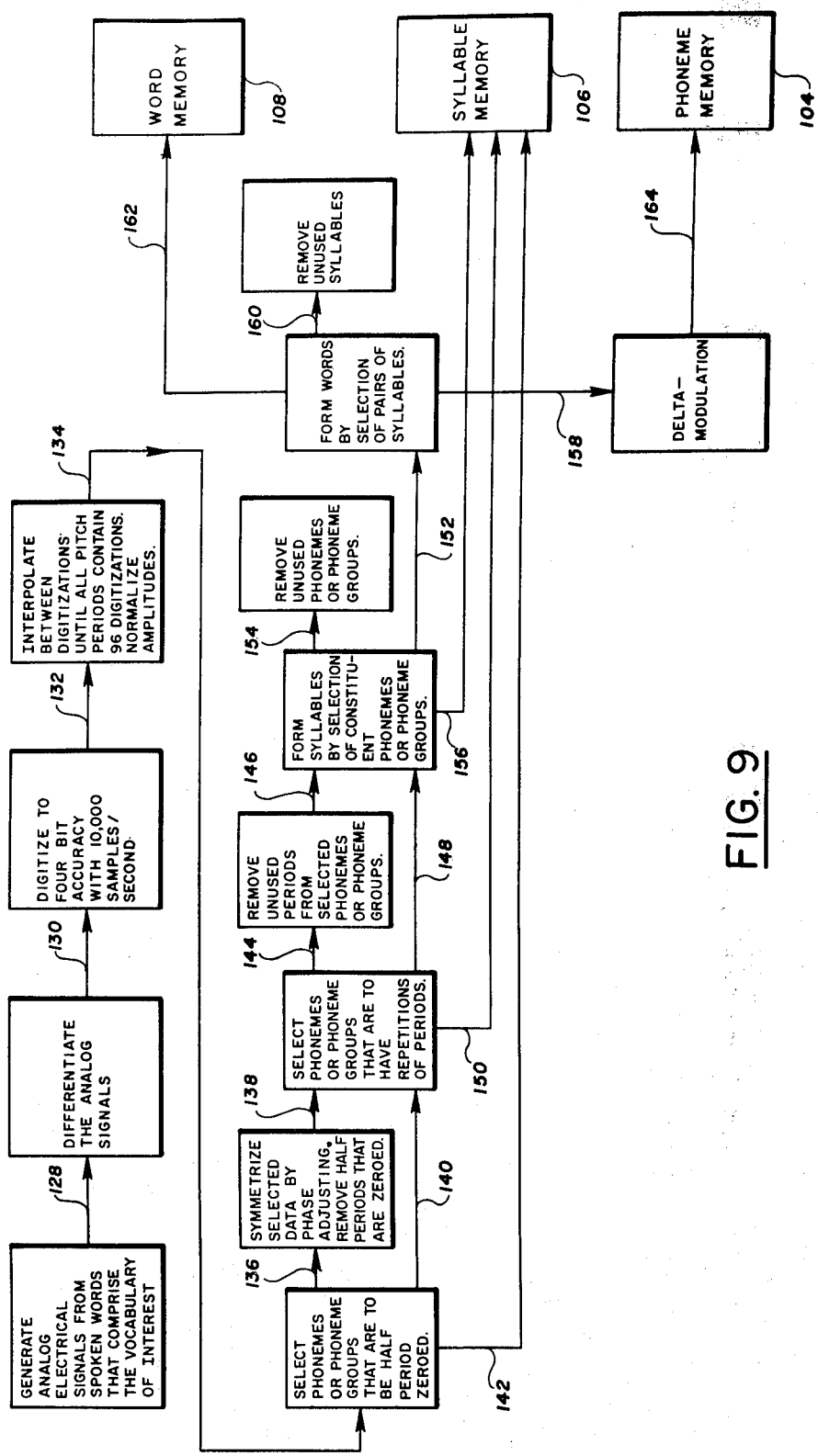
FIG. 9 is a block diagram illustrating several methods of analysis for generating the information in the phoneme, syllable, and word memories of the speech synthesizer according to the invention.

Referring now more particularly to FIG. 9, a block diagram of the method by which the contents of the phoneme memory 104, the syllable memory 106, and the word memory 108 of the speech synthesizer 103 are produced is illustrated. A complete description of this method is set forth in the referenced patent.

TABLE 9

Contents of the Delta-Demodulation Read-Only Memory 184A

The information below is identical to that contained in Table 4, but written in binary form. Note also that negative values of $f(\Delta_i, \Delta_{i-1})$ are expressed in two's complement form.

| $\Delta_i$ | | $\Delta_{i-1}$ | | $f(\Delta_i, \Delta_{i-1})$ | | | |
|---|---|---|---|---|---|---|---|
| LSB $A_0$ | MSB $A_1$ | LSB $A_2$ | MSB $A_3$ | MSB $B_0'$ | $B_1'$ | $B_2'$ | LSB $B_3'$ |
| 0 | 0 | 0 | 0 | 1 | 1 | 0 | 1 |
| 0 | 0 | 0 | 1 | 1 | 1 | 1 | 1 |
| 0 | 0 | 1 | 0 | 1 | 1 | 0 | 1 |
| 0 | 0 | 1 | 1 | 1 | 1 | 1 | 1 |
| 0 | 1 | 0 | 0 | 0 | 0 | 0 | 0 |
| 0 | 1 | 0 | 1 | 0 | 0 | 0 | 1 |
| 0 | 1 | 1 | 0 | 0 | 0 | 0 | 0 |
| 0 | 1 | 1 | 1 | 0 | 0 | 0 | 1 |
| 1 | 0 | 0 | 0 | 1 | 1 | 1 | 1 |
| 1 | 0 | 0 | 1 | 0 | 0 | 0 | 0 |
| 1 | 0 | 1 | 0 | 1 | 1 | 1 | 1 |
| 1 | 0 | 1 | 1 | 0 | 0 | 0 | 0 |
| 1 | 1 | 0 | 0 | 0 | 0 | 0 | 1 |
| 1 | 1 | 0 | 1 | 0 | 0 | 1 | 1 |
| 1 | 1 | 1 | 0 | 0 | 0 | 0 | 1 |
| 1 | 1 | 1 | 1 | 0 | 0 | 1 | 1 |

TABLE 9-continued

Contents of the Delta-Demodulation Read-Only Memory 184A

The information below is identical to that contained in Table 4, but written in binary form. Note also that negative values of $f(\Delta_i, \Delta_{i-1})$ are expressed in two's complement form.

Figure 16:
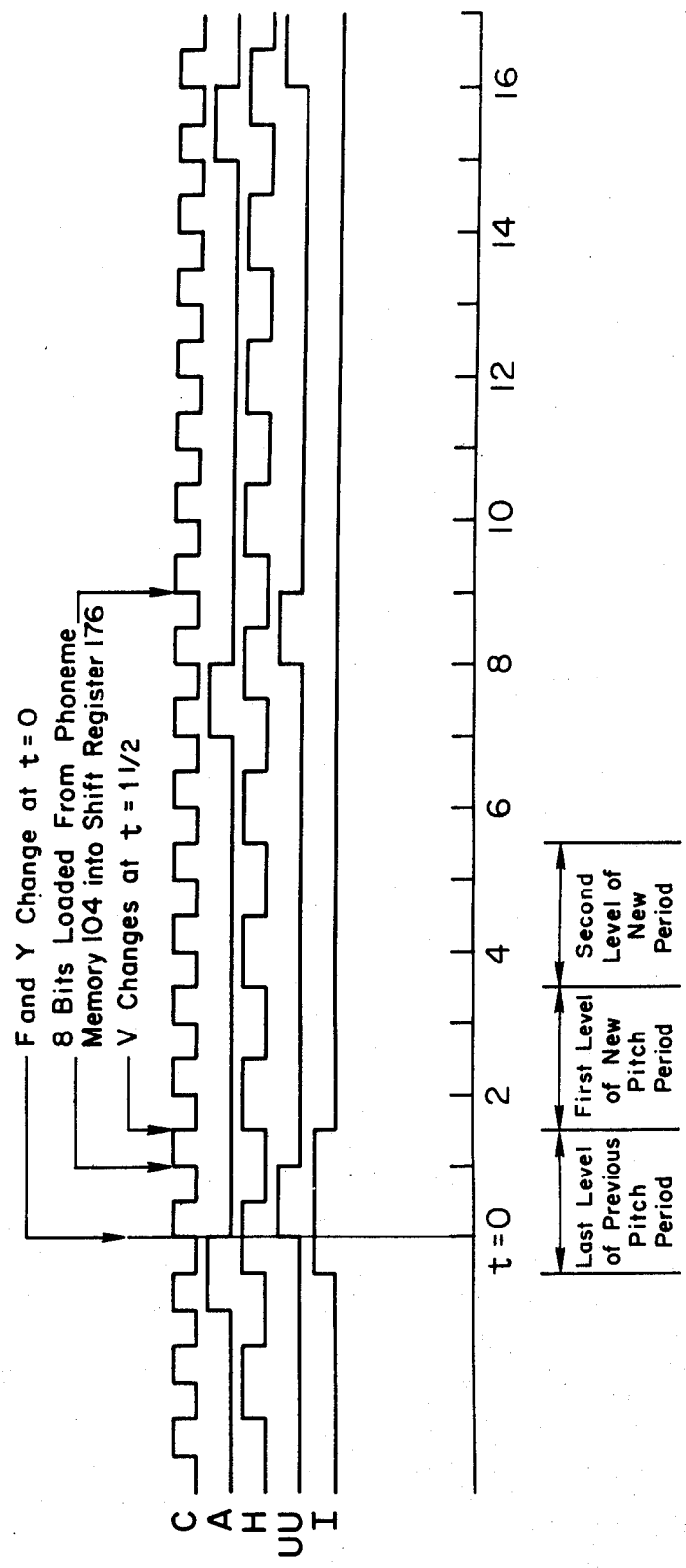
FIG. 16 is a logic timing diagram which illustrates the operation of the delta-modulation circuit in the synthesizer electronics.

As described more particularly in the referenced patent, the synthesizer produces a continuous stream of data bits at the output of shift register 176. The delta-modulation decoder circuit 184 implements the algorithm described in Table 4 and its discussion to produce a speech waveform. In FIG. 16 are shown some of the waveforms involved in this process. It is assumed that $T=0$ is the start of a new pitch period of sound. At $t=1$, the first eight-bit data byte of this pitch period is loaded from the phoneme read-only memory 104 into the output shift register 176. Thus at $t=1_+$, $\Delta_1$, the first value of $\Delta_i$ for this pitch period is available to the delta-modulation decoder read-only memory 184A. The value of $\Delta_i$ for the previous digitization would normally be taken from the two bits of the shift register 236, but since this is the first digitization of the pitch period, there is no previous value and the initial value, $\Delta_0 = 10$, is selected as explained in the previous discussion of delta modulation. This is accomplished by gating a 1 into the input $A'_3$ of the delta-modulation decoder read-only memory 184A by the type D flip-flop 184B and the NOR gate 184C.

The least significant bit is set equal to zero since the waveform I, the output of the flip-flop 184B, is present at the load input of shift register 236. The flip-flop 184B also sets the initial value of the previous output level $v_0 = 0111$, through the action of NAND gates 184D, 184E, and 184F, and the NOR gate 184G. The sixteen four-bit numbers stored in the delta-modulation decoder read-only memory 184A are the values of the function $f(\Delta_{i-1}, \Delta_i)$, for all the possible input values of $\Delta_{i-1}$ and $\Delta_i$. These numbers are listed in Table 9. The output of the delta-modulation decoder read-only memory 184A is connected to one of the inputs of the four-bit adder 184H. The other input of the adder 184H is connected (through the gates 184D, 184E, 184F, and 184G which provide the initial value of $v_i$) to the output of the latch 184I, which stores the current value of the output waveform $v_i$. Subtractions as well as additions are performed by the adder 184H by representing the negative values of f in two's complement form.

At $t=1$, the first value of I, based on $\Delta_1$ and $\Delta_0$ is presented to adder 184H along with the initial value of $v_i$, $v_0 = 0111$. Thus the first value of the output waveform, $v_1$, appears at the $\Sigma$ output of the adder 184H. This value is clocked into latch 184I at $t=1.5$ by waveform H. The digital to analog converter 186 converts this data into the first analog level of the pitch period. This is consistent with the fact that the analog switch 188 changes state at $t=1.5$. At $t=3_+$, the output shift register 176 has been shifted by two bits, so the next value of $\Delta_i$, $\Delta_2$, is available, and the previous value has been shifted to $\Delta_{i-1}$. Thus at $t=3.5$, the output of the adder 184H equals $f_2 + v_1 = v_2$, and this number is transferred to the output of latch 184I at $t=3.5_+$. This process is continued until the start of the next pitch period when the system is again initialized by the flip-flop 184B.

The speech waveform coming from the output of the analog switch 188 is amplified by filter amplifier 190 and is coupled to the loudspeaker 192 by a matching transformer 262. Elements in a feedback loop operational amplifier 190A give a frequency response which rolls off about 4500 Hertz and below 250 Hertz to remove unwanted components at the period repetition, half-period zeroing, and digitization frequencies.

For simplicity, the previous hardware description of the preferred embodiment has not included handling of the symmetrized waveform produced by the compression scheme of phase adjusting. Instead, it was assumed that complete symmetrized waveforms (instead of only half of each such waveform) are stored in the phoneme memory 104. It is the purpose of the following discussion to incorporate the handling of symmetrized waveforms in the preferred embodiment.

Figure 10:
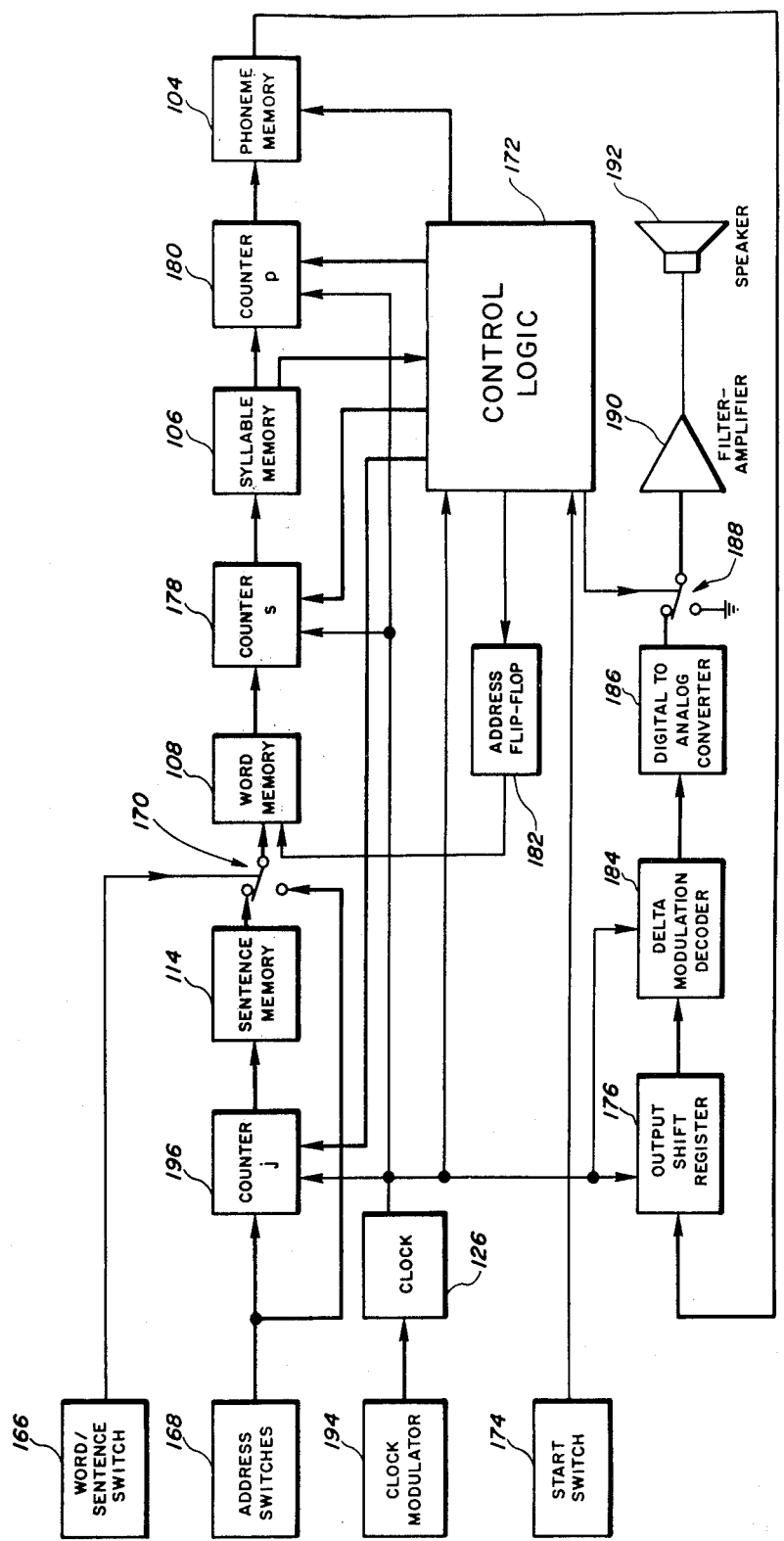
FIG. 10 is a block diagram of the synthesizer electronics incorporating the preferred embodiment of the invention.

The result may be achieved by storing the output waveform of the delta modulation decoder 184 of FIG. 10 in either a random access memory or left-right shift register for later playback into the digital to analog converter 186 during the second quarter of each period of each phase adjusted phoneme. The same result may also be achieved by running the delta modulation decoder circuit 184 backwards during the second quarter of such periods because the same information used to generate the waveform can be used to produce its symmetrized image. In the operation of the circuitry of the preferred embodiment in this manner, the control logic 172, the output shift register 176, and the delta modulation decoder 184, of FIG. 10 must be modified as is described below, for each half period zeroed phoneme (since half period zeroing and phase adjusting always occur together). Phonemes which are not half period zeroed do not utilize the compression scheme of phase adjusting. For such phonemes the operation of the circuitry of the preferred embodiment remains the same as described above.

When half period zeroing and phase adjusting are used, the 96 four-bit levels which generate one pitch period of sound are divided into three groups. The first 24 levels comprise the first group and are generated from 24 two-bit pieces of delta modulated information. This information is stored in the phoneme memory 104 as six consecutive 8-bit bytes which are presented to the output shift register 176 by the control logic 172 and are decoded by the delta modulation decoder 184 to form 24 four-bit levels. The operation of the circuitry of the preferred embodiment during the playing of these first 24 output levels is unchanged from that described above. The next 24 levels of the output comprise the second group and are the same as the first 24 levels, except that they are output in reverse order, i.e., level 25 is the same as level 24, level 26 is the same as level 23, and so forth to level 48, which is the same as level 1. To perform this operation, the previously described operation of the circuit of FIG. 10 is modified. First, the control logic 172 is changed so that during the second 24 levels of output, instead of taking the next six bytes of data from the phoneme memory, the same six bytes that were used to generate the first 24 levels are used, but they are taken in the reverse order. Second, the direction of shifting, and the point at which the output is taken from the output shift register 176 is changed such that the 24 pieces of two-bit delta modulation information are presented to the delta modulation decoder circuit 184 reversed in time from the way in which they were presented during the generation of the first 24 levels. Thus, the input of the delta modulation decoder 184 at which the previous value of delta modulation information was presented during the generation of the first 24 levels has, instead, input to it, the future value. Third, the delta modulation decoder 184 is changed so that the sign of the function $f(\Delta_{i-1}, \Delta_i)$ described in Table 4 is changed. With these modifications, the delta demodulator circuit 184 will operate in reverse, i.e., for an input which is presented reversed in time, it will generate the expected output waveform, but reversed in time. This process can be illustrated by considering the example of Table 10, for the case where the changes to the output shift register 176, and the delta modulation decoder 184 described above have been made. Referring to Table 10, suppose that digitization 24 is the 24th output level for a phoneme in which half period zeroing and phase adjusting are used. Since the amplitude of the reconstructed waveform for this digitization is 9, the 25th output level will again have the value 9. Subsequent values of the output will be generated from the same series of 24 values of $\Delta_i$, but taken in reverse order, and with the modifications to the delta modulation algorithm indicated above. Thus for the 26th output level, Table 10 gives $\Delta_i = 3$ and $\Delta_{i-1} = 3$. Table 4 gives $f(\Delta_{i-1}, \Delta_i) = 3$ for this case. Since one of the modifications to the delta modulation decoder 184 is to change the sign of $f(\Delta_{i-1}, \Delta_1)$, the 26th output level is $9 - 3 = 6$. For the 27th output level, Table 10 gives $\Delta_i = 2$ and $\Delta_{i-1} = 2$. Applying the appropriate value of $f(\Delta_{i-1}, \Delta_i)$ from Table 4 shows the 27th output level to be $6 - 3 = 3$. This process can be continued to show that the second 24 output levels will be the same as the first 24 levels, but reversed in time.

TABLE 10

Example of a Quarter Period of Delta Modulation Information and the Reconstructed Waveform

| Digitization | Delta Modulation Information (decimal) | Amplitude of Reconstructed Waveform |
|---|---|---|
| 1 | 3 | 10 |
| 2 | 3 | 13 |
| 3 | 2 | 14 |
| 4 | 2 | 15 |
| 5 | 1 | 15 |
| 6 | 1 | 14 |
| 7 | 0 | 11 |
| 8 | 0 | 8 |
| 9 | 0 | 5 |
| 10 | 1 | 4 |
| 11 | 3 | 5 |
| 12 | 2 | 6 |
| 13 | 3 | 9 |
| 14 | 3 | 12 |
| 15 | 0 | 11 |
| 16 | 0 | 8 |
| 17 | 0 | 5 |
| 18 | 1 | 4 |
| 19 | 1 | 3 |
| 20 | 1 | 2 |
| 21 | 2 | 2 |
| 22 | 2 | 3 |
| 23 | 3 | 6 |
| 24 | 3 | 9 |

For the case in which half period zeroing and phase adjusting are used, the last 48 output levels of each pitch period are always set equal to a constant. The operation of the circuitry of the preferred embodiment which accomplishes this is the same as described previously.

The terms and expressions which have been employed here are used as terms of description and not of limitations, and there is no intention, in the use of such terms and expressions, of excluding equivalents of the features shown and described, or portions thereof, it being recognized that various modifications are possible within the scope of the invention claims.

I claim:

1. A system for expanding floating zero delta modulated compressed information signals corresponding to original information time domain signals, said system comprising:

memory means for storing said compressed information signals;

storage means for temporarily storing a signal representative of the amplitude of a sample point on a synthesized waveform corresponding to one of said original information time domain signals, said storage means having an output terminal for manifesting the signals stored therein;

means for contemporaneously accessing successive compressed information signals corresponding to three adjacent sample points of said original information signals;

means coupled to said accessing means for comparing said successive compressed information signals accessed from said memory means and for generating an incremental signal value restricted to one of a predetermined confined number of values when the difference between said successive compressed information signals is within the most positive one half of said confined number of values and restricted to the negative of said one of a predetermined confined number of values when said difference is within the most negative one half of said confined number of values;

adder means coupled to said generating means and said storage means for algebraically combining said incremental signal value with said synthetic waveform sample point signal to produce a successive synthesized waveform sample point signal; and timing and control means for replacing the contents of said storage means with said successive synthesized waveform sample point signal and for enabling said accessing means to contemporaneously access the next successive compressed information signals corresponding to the next adjacent sample points.

2. The combination of claim 1 wherein said memory means and said storage means are digital storage devices, and wherein said compressed information signals and said synthetic waveform sample point signals are digital characters.

3. The combination of claim 1 wherein said generating means includes a memory device for storing signals corresponding to a complete set of said confined number of values, and address means for reading said incremental signal value in response to the application of said successive compressed information signals thereto.

4. The combination of claim 3 wherein said memory device comprises a read-only memory.

5. The combination of claim 1 wherein said accessing means includes a temporary storage register for storing said successive compressed information signals.

6. The combination of claim 1 wherein said timing and control means includes means for supplying an initial preselected value of said synthesized waveform sample point signal to said storage means and means for supplying an initial preselected value of one of said successive compressed information signals to said generating means at the beginning of a cycle of operation.

7. The combination of claim 1 wherein said system further includes means coupled to said storage means output terminal for combining successive synthesized waveform sample point signals to produce said synthesized waveform.

8. The combination of claim 7 wherein said successive synthesized waveform sample point signals are digital characters, and wherein said combining means includes a digital to analog converter.

* * * * *